(12) United States Patent
Schreiber et al.

(10) Patent No.: US 8,183,536 B2
(45) Date of Patent: May 22, 2012

(54) SYSTEM FOR MONITORING OPTICAL MODULES OF HIGH-POWER LASERS

(75) Inventors: Horst Schreiber, Rochester, NY (US); Paul Michael Then, Victor, NY (US)

(73) Assignee: Corning Incorporated, Corning, NY (US)

( * ) Notice: Subject to any disclaimer, the term of this patent is extended or adjusted under 35 U.S.C. 154(b) by 616 days.

(21) Appl. No.: 12/389,727

(22) Filed: Feb. 20, 2009

(65) Prior Publication Data

US 2010/0213391 A1    Aug. 26, 2010

(51) Int. Cl.
*G01J 1/42* (2006.01)
(52) U.S. Cl. .......... 250/372; 250/458.1; 250/461.1; 250/459.1; 250/487.1; 372/25; 372/80
(58) Field of Classification Search ........... 250/487.1, 250/458.1, 461.1, 459.1, 372; 372/25, 80
See application file for complete search history.

(56) References Cited

U.S. PATENT DOCUMENTS

| | | | |
|---|---|---|---|
| 5,018,152 A * | 5/1991 | Linne et al. | 372/25 |
| 5,755,998 A | 5/1998 | Yamazaki et al. | |
| 6,822,985 B2 * | 11/2004 | Tsunekane et al. | 372/29.021 |
| 7,319,289 B2 | 1/2008 | Suehiro et al. | |
| 2010/0245830 A1 * | 9/2010 | Ito et al. | 356/447 |

* cited by examiner

*Primary Examiner* — Christine Sung
(74) *Attorney, Agent, or Firm* — Walter M. Douglas

(57) ABSTRACT

High-power excimer lasers are assembled with individually replaceable optical module subsystems containing consumable optical components. Windows formed in the enclosures of the optical modules incorporate a fluorescent material for converting ultraviolet light scattered from the components of the optical module into visible light emanating from the windows. Changes in the amount or location of the visible light emanating from the windows are interpreted as indications of the degradation in the performance of the optical modules.

35 Claims, 5 Drawing Sheets

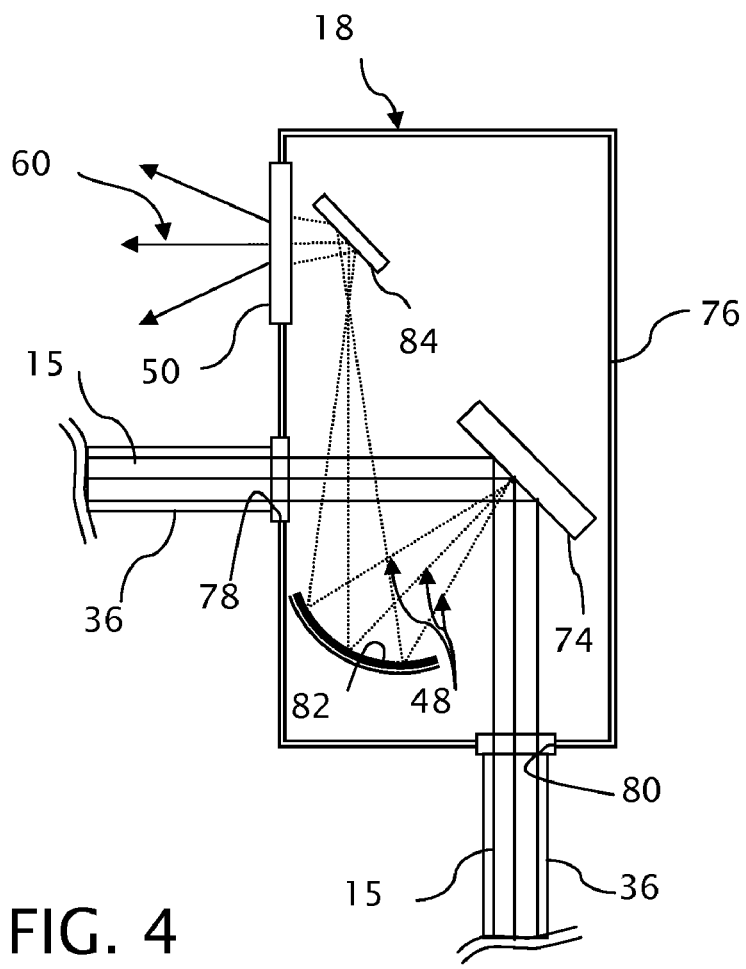
FIG. 4
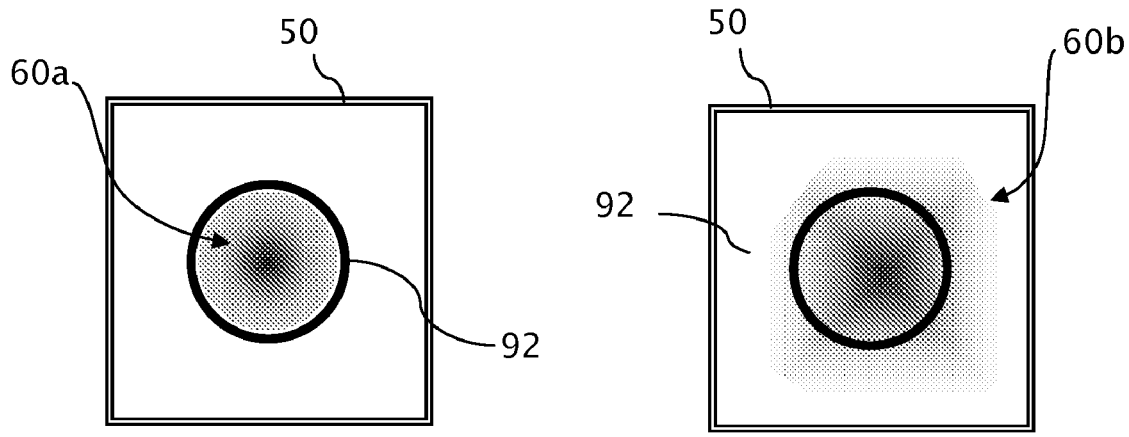
FIG. 6A
FIG. 6B

SYSTEM FOR MONITORING OPTICAL MODULES OF HIGH-POWER LASERS

TECHNICAL FIELD

The invention relates to laser systems and their modular components and particularly to high-power lasers of the type that include one or more oscillators for forming and amplifying a laser beam in combination with a succession of optical module subsystems for performing functions such as coupling, redirecting, treating, monitoring, and interrupting the laser beam.

BACKGROUND

High-power lasers, particularly excimer lasers, are used in continuous manufacturing processes, such as for micromachining, where the cost of operation is greatly influenced by the amount of downtime required to maintain the lasers. Although the lasers themselves and especially their components often account for only a small portion of the overall cost of the manufacturing machines in which they are used, any interruption in the operation of the lasers can suspend production along an entire fabrication line.

For example, high-power excimer lasers used in microlithographic fabricators of semiconductors or flat panel displays are typically operated on a 24-hour per day basis, i.e., without interruption except for scheduled or unscheduled maintenance. While the lasers are made to be highly reliable, high-power ultraviolet pulses produced within the lasers eventually degrade the optical components of the laser leading to an unacceptable loss of function or other failure of the lasers. Laser manufacturers can predict mean time between failures along with mean time to repair the lasers, and maintenance downtimes are often scheduled on this basis.

To simplify and speed the repair of the high-power lasers, the lasers are typically built in a modular form with one or more self-contained oscillator chambers in combination with a succession of self-contained optical module subsystems. The individual modules can be removed and replaced independently of the other modules on a schedule intended to extend the overall lifetimes of the lasers.

However, not all failures occur according to predictions, and emergency repairs during unscheduled downtimes are sometimes necessary. The modular form of the laser components speeds the repair, but diagnosing which component or combination of components is responsible for the failure can complicate and delay the necessary repair. For example, repair technicians may need to replace one module after another in a sequence until the failed module is discovered. Any such delay, particularly on an unscheduled basis, can be extremely costly.

SUMMARY

The invention in accordance with one or more of its preferred embodiments provides for identifying failing optical modules of high-power lasers. The identification of the failing modules can speed repairs, particularly during unscheduled production downtimes. Failure progressions of the individual modules can also be monitored, and repairs can be scheduled in advance of the outright failure of the modules. The scheduled replacement of failing modules can be more readily accommodated within a fabrication line with less disruption or scrap. The monitoring of the optical modules can be carried out manually, such as by periodic observation, or automatically, such as by the use of sensors. The incremental cost of modifying optical modules to provide an indication of their progressive degradation is very small in comparison to the potential savings.

One version of the invention involves a system for monitoring the degradation of an optical module subsystem of an ultraviolet laser. The optical module includes the usual arrangement of a component for engaging an ultraviolet laser beam propagating through the module, an enclosure for confining the component within an operating environment, and one or more apertures within the enclosure for supporting the ingress and egress of the ultraviolet laser beam through the enclosure. The component of the optical module, like most such components, is subject to degradation manifest as a scattering of a portion of the ultraviolet laser beam conveyed through the module. A window is formed in the enclosure incorporating a fluorescent material for converting ultraviolet light scattered from the component of the optical module into visible light emanating from the window. The visible light emanating from the window, which increases with the amount of ultraviolet light scattered from the component, provides an indication of the relative degradation of the optical component.

The window can be positioned so that only light scattered from the component reaches the window or can be positioned so that a baseline amount of ultraviolet light reaches the window in accordance with the expected operation of the component, and the amount or area over which the visible light emanates from the window changes as a function of the component's degradation.

Preferably, the fluorescent material is located between a first spectral filter for blocking the ingress of the visible light from the fluorescing material into the enclosure and a second spectral filter for blocking the egress of the scattered ultraviolet light out of the enclosure. The first spectral filter prevents the fluorescing visible light from contaminating the laser beam with unwanted wavelengths. The second spectral filter prevents the escape of potentially unsafe ultraviolet light from the enclosures.

The enclosure itself is preferably made as usual from a non-optically transmissive material, such as nickel-plated aluminum, for confining ultraviolet light within the enclosure and is preferably sealed as usual for confining a non-reactive atmosphere, such as nitrogen, for facilitating ultraviolet light propagation. The window interrupts the enclosure while maintaining the desired confinement of both the ultraviolet light and the non-reactive atmosphere within the enclosure.

The window is preferably located within an uninterrupted line of sight to the component so that ultraviolet light scattered from the component in the direction of the window actually reaches the window. However, mirrors or other optics can be included within the enclosure to redirect the scattered light onto the window. In addition, focusing optics can be used to collect and concentrate the scattered ultraviolet light onto the window.

The fluorescent material is preferably incorporated within the window. For example, the window can be made of an amorphous glass and the fluorescent material can be incorporated as a dopant within the amorphous glass. The two spectral filters for filtering visible and ultraviolet light can be formed on opposite sides of the window glass. Alternatively, the fluorescent material can be coated onto the window. However, a barrier layer may be needed to avoid exposure of the fluorescent material within the enclosure to prevent the potentially contaminating effects the outgassing of the fluorescent material. Such a barrier could be incorporated into the visible light filter.

The window can also be positioned to receive a baseline amount of ultraviolet light in accordance with the expected operation of the component. For example, the window could be positioned in line with a partial reflection of ultraviolet light from the component as a residual effect of the component's design. Thus, some amount of fluorescing is expected in accordance with the normal operation of the component. Target markings can be applied to the window for monitoring changes in the size or shape of a fluorescing region of the window as an indication of aberrant performance associated with the degradation of the component.

The windows can be visually inspected for changes in the amount or location of fluorescing light emitted from the windows to identify failed or failing modules within the laser. Such inspections can be made following an unscheduled failure of the laser to facilitate the laser's immediate repair or as a part of an inspection protocol to identify degrading components prior to their failure for scheduling future repairs.

Automated inspections are also possible. For example, a sensor can be positioned for detecting visible light emanating from the window. A controller can be connected to the sensor for monitoring changes in an amount of visible light emanating from the window and connected to an output device for providing an indication of a significant degradation of the component within the module. Processing capabilities can be incorporated into the controller for recognizing trends or other changes indicative of component degradation or predictive of component failure.

Another version of the invention as an ultraviolet laser assembly includes an oscillator chamber for forming or amplifying a laser beam and a plurality of optical modules positioned along an optical pathway of the laser beam. Each of the optical modules includes a component for engaging an ultraviolet laser beam propagating through the module, an enclosure for confining the component within an operating environment, and one or more apertures within the enclosure for supporting the ingress and egress of the ultraviolet laser beam through the enclosure. The component is subject to degradation manifest as a scattering of a portion of the ultraviolet laser beam. In addition, windows are formed in the enclosures of a plurality of the optical modules. The windows are treated to convert ultraviolet light scattered from the components of the optical modules into visible light emanating from the windows.

A housing preferably contains the oscillator chamber and the plurality of optical modules. A window within the housing provides a viewing aperture through which the windows formed in the enclosures of the optical components can be viewed. For automating the inspection process for identifying failing or failed components, the laser assembly preferably includes sensors for detecting the visible light emanating from the windows of the optical modules, a controller for receiving signals from the sensors and evaluating the signals to determine if the optical performance of any of the optical components has degraded, and an output device for providing indications of any significant degradations among the optical modules. Preferably, the controller compares changes in the visible light detected by the sensors to known failure modes for anticipating failure of one or more of the optical modules.

Another version of the invention provides for maintaining an ultraviolet laser in which one or more optical modules of the laser has a window treated for converting scattered ultraviolet light into visible light emanating from the window. Visible light emanating from the window of the optical module is monitored as an indication of ultraviolet light of a laser beam being scattered within the module. The monitored visible light is evaluated to determine if the optical performance of the optical component has degraded. The optical component is removed from the laser following a determination based on the evaluation of the monitored visible light that the optical performance of the component has degraded beneath a threshold.

A visual inspection can be performed to determine if a change in an amount of visible light emanating from the window of the optical module is above a threshold. A similar inspection can be made to determine if a change in area over which the visible light emanates from the window of the optical module is above a threshold. The laser can be shutdown or scheduled for shutdown based on a change in the amount or area over which the visible light emanates from the window.

According to one arrangement, the window of the optical module is viewed through a window in a laser housing containing the optical module together with an oscillator chamber for forming or amplifying the laser beam. Visible light emanating from windows in a plurality of optical modules can be monitored within a common laser housing. The visible light from the plurality of optical components can be evaluated to determine if optical performance of one or more of the optical components has degraded. One or more the associated optical modules with a component found to have degraded beneath the threshold can be removed and replaced with a like module.

According to a more automated inspection procedure, a signal can be collected from a sensor positioned for detecting visible light emanating from the window of the optical module. The sensor signal can be processed in a controller and an indication of any significant degradation of the optical module can be provided by an output device. Changes in the visible light detected by the sensor can be comparing to changes associated with known failure modes for anticipating failure of the optical component. Downtime for the laser can be scheduled based on the anticipated failure of the optical component for removing and replacing the associate optical module with a like module during the scheduled downtime.

Yet another version of the invention provides for identifying a degraded optical module of an ultraviolet laser system in which an optical component within the module produces scattered ultraviolet light accompanying a degradation in the component's optical performance. A window is positioned to intercept the scattered ultraviolet light and be visible to an observer. The window is provided with fluorescent properties responsive to the scattered ultraviolet light to emit visible light observable by the observer.

The amount or distribution of the visible light emitted from the window can be assessed to determine if optical performance of the optical component has degraded. The observer can report on a status of the optical module based on the determination of whether the performance of the optical component has degraded. The observer can also schedule a downtime for the laser based on the determination of whether the performance of the optical component has degraded.

BRIEF DESCRIPTION OF THE DRAWING FIGURES

FIG. 4 is a schematic cross-sectional view through another of the optical modules incorporating additional optics for concentrating and redirecting scattered light to a fluorescent window.

FIGS. 6A and 6B are schematic front views of the fluorescent windows of FIGS. 5A and 5B depicting different patterns of visible light emanating from the windows in the non-degraded and degraded conditions of the component.

DETAILED DESCRIPTION

Figure 1:
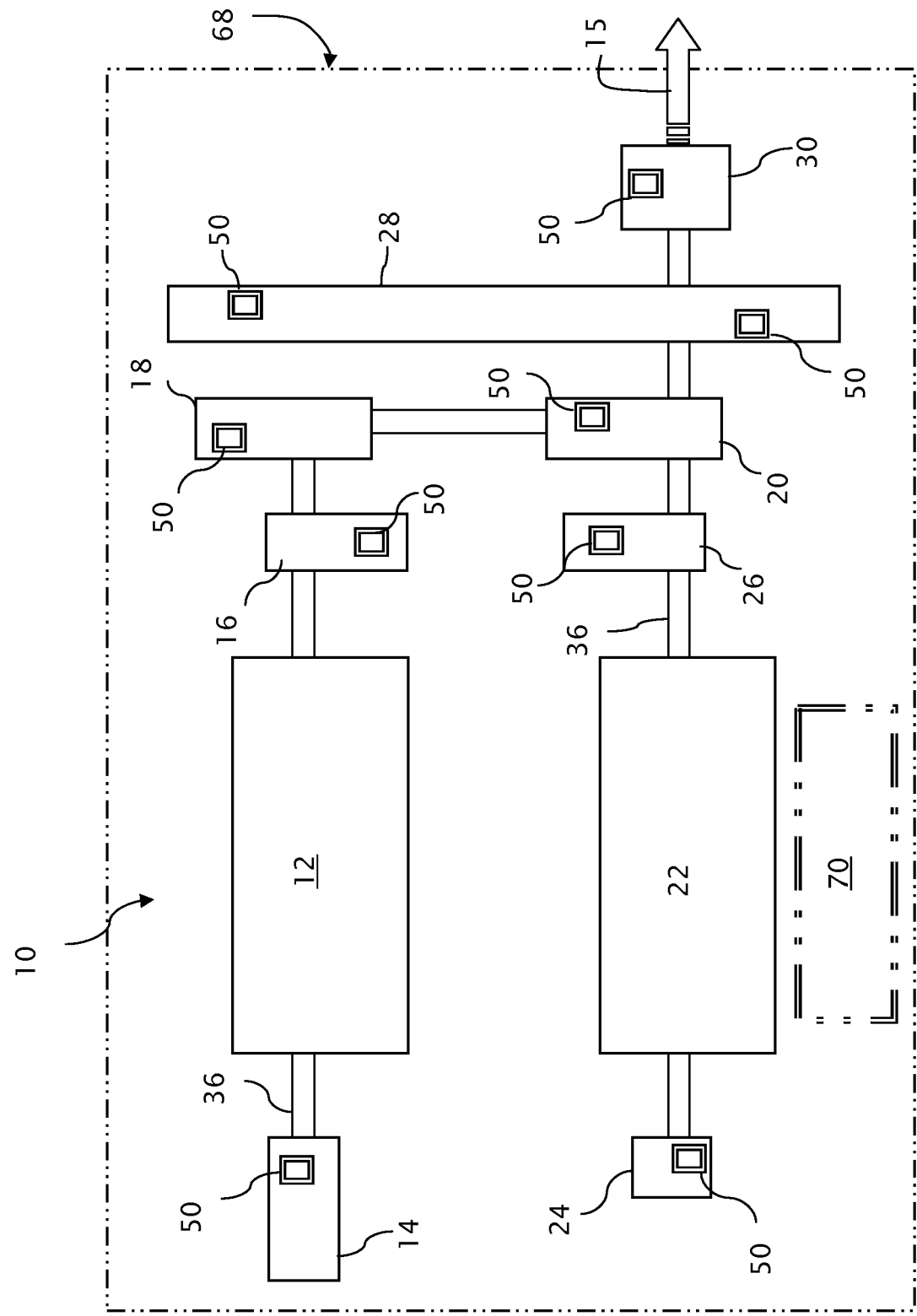
FIG. 1 is a diagram of a high-power excimer laser in a dual-chamber master-oscillator power-amplifier (MOPA) configuration including a series of optical modules modified according to the invention for providing a visible indications of operating conditions within the laser modules.

A high-power excimer laser 10 operating in the ultraviolet (UV) spectrum (e.g., 193 nanometer wavelength) and useful for semiconductor manufacturing within a microlithographic stepper is depicted in FIG. 1 in a dual-chamber configuration known generally as a master-oscillator power-amplifier (MOPA) laser architecture. Lasers of this type are available from Cymer, Inc. of San Diego, Calif. Lambda Physik Inc. of Fort Lauderdale, Fla., a subsidiary of Coherent, Inc., produces high-power excimer lasers with a master-oscillator regenerative-ring-amplifier (MORRA) architecture. Both representative laser types incorporate modular subsystems for simplifying and speeding the maintenance or repair of the lasers. Such lasers used for microlithographic processes are generally required to deliver at least 40 watts of power at a pulse repetition rate of at least 4 kilohertz. Each pulse when fully formed can include an energy content of 10 millijoules or higher, which over millions or even billions of pulses can significantly degrade the optical components required for shaping, monitoring, or otherwise conveying the pulses.

The laser 10 includes a master oscillator 12 having a resonant cavity structure powered by high-voltage electrical pulses, which combined with a line-narrowing module 14, produces a light beam 15 in the form of a succession of narrow bandwidth pulses. The line-narrowing module 14 can include a combination of beam expanders and a diffraction grating under active control for adjusting the precise wavelength of the light beam 15. A line-center analysis module 16 monitors the light beam 15 for pulse energy and wavelength.

Two relay modules 18 and 20 convey the light beam 15 to a power amplifier 24 for maximizing the pulse energy of the light beam 15. The relay module 18 can also be arranged to provide access for spatially measuring the light beam 15. The relay module 20 functions as a beam separator for independently directing the light beam 15 into and out of the power amplifier 22. A beam reverser module 24 returns the light beam 15 for a second pass through the power amplifier 22. Between the relay module 20 and the power amplifier 22 is a spectral analysis module 26 for measuring both the spectral bandwidth and the output pulse energy of the light beam 15 output from the power amplifier 22. After passing through the relay module 20, which can also include a diagnostic port for spatially measuring the light beam 15, the light beam 15 enters a pulse stretcher module 28, which includes a plurality of delay lines for temporally expanding each pulse of the light beam 15. A shutter module 30 controls the output of the so fashioned laser beam 15.

Figure 2:
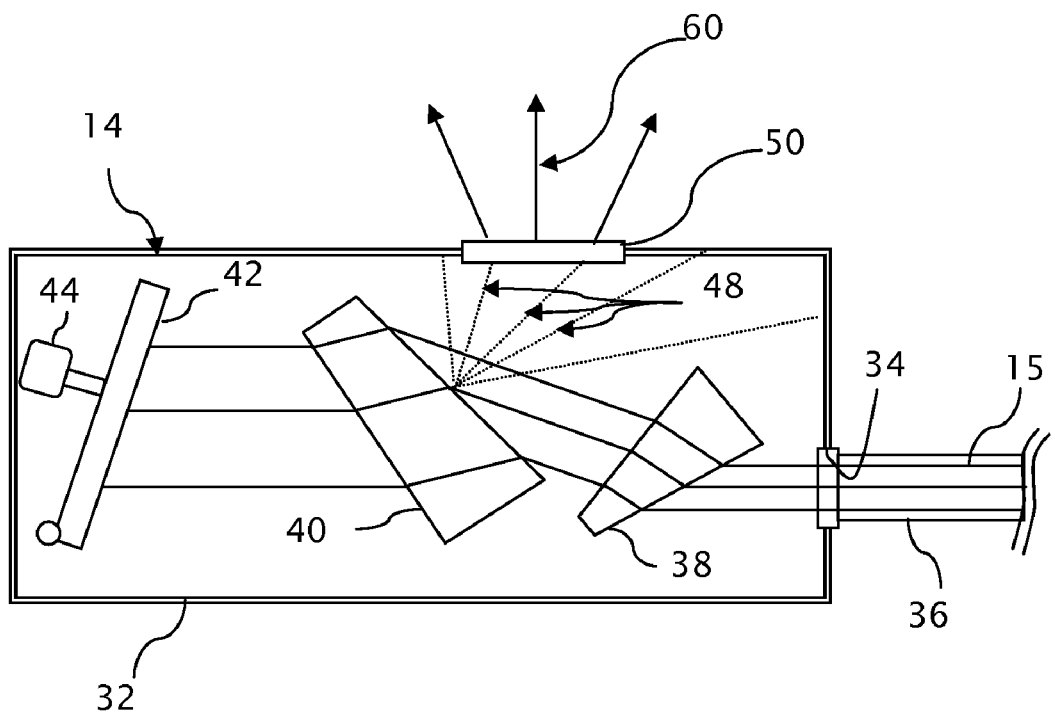
FIG. 2 is a schematic cross-sectional view through one of the optical modules showing optical components within the module along with a fluorescent window for monitoring ultraviolet light scattered from the components.

A view of the interior of the line-narrowing module 14 is shown in FIG. 2. The module 14 includes an enclosure 32 for maintaining a non-reactive environment for propagating the laser beam 15. The enclosure 32, which is typically made of metal sheeting such as nickel-plated aluminum, polished aluminum, or stainless steel, is purged with nitrogen or other inert gas and hermetically sealed. The light beam 15 enters the enclosure 32 through a sealed aperture 34, which can include a sealed window or a sealed coupling to a tube 36 for confining the laser beam 15 between optical modules.

The optical components within the line-narrowing module 14 include prismatic elements 38 and 40 for expanding and contracting the light beam 15 en route to and from an actively controlled diffraction grating 42, including a stepper motor 44 for selectively retroreflecting wavelengths of light according to a Littrow configuration. The prismatic element 40 is depicted as undergoing an anticipated surface degradation as a consumable element within the laser 10 resulting in an increase in undesired scatter 48 of a portion of the light beam 15. A fluorescent window 50 is formed in the enclosure 32 in the expected line of sight of the scattered ultraviolet light 48.

Figure 3:
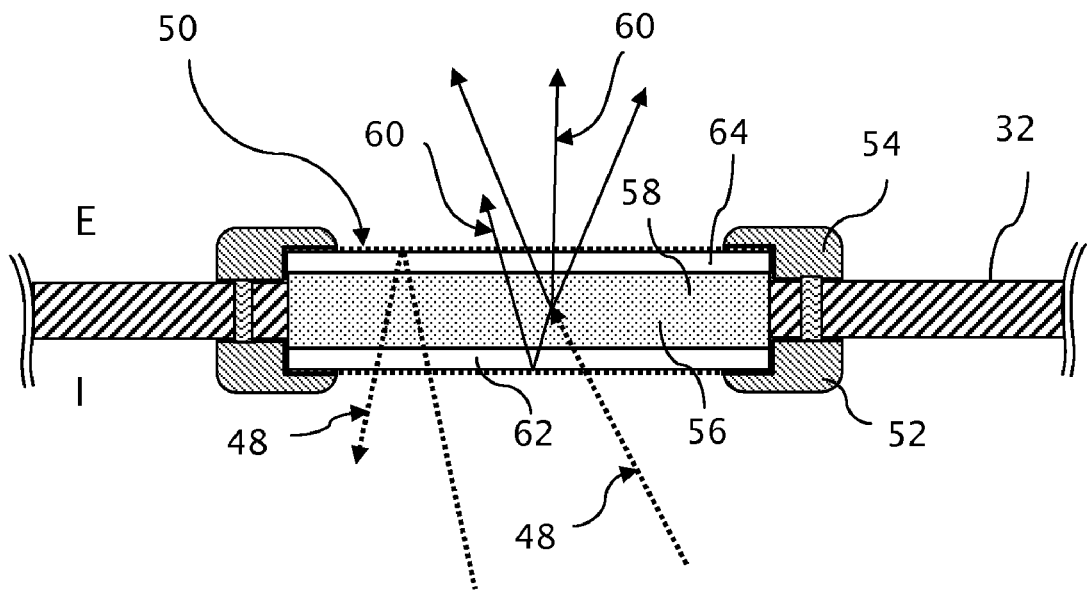
FIG. 3 is a schematic cross-sectional view of the window depicting the performance of various layers.

As shown in FIG. 3, the window 50, which is hermetically sealed to the enclosure 32 by interior and exterior flanges 52 and 54, includes three layers. A middle layer 56 is preferably formed by an amorphous glass, such as fused silica, including a fluorescent dopant 58 integrated within the glass. For example, Sumita Optical Glass, Inc. of Saitama City, Japan produces a line of fluorescent glasses under the trade name LUMILASS useful for purposes of this invention, including LUMILASS-R7, which fluoresces red in the presence of ultraviolet light, LUMILASS-G9, which fluoresces green in the presence of ultraviolet light, and LUMILASS-B, which fluoresces blue in the presence of ultraviolet light. The scattered ultraviolet light 48 interacts with the fluorescent dopant 58 within the middle glass layer 56 and is emitted as scattered visible light 60, which is visible from the exterior of the module enclosure 32.

On one side of the fluorescent glass layer 56 interior of the enclosure 32 is a spectral filter layer 62 for blocking the scattered visible light 60 from entering the enclosure 32. Preferably, the spectral filter layer 62 is formed as a dichroic filter containing alternating layers of optical coatings built up upon a glass substrate, preferably the middle glass layer 56, for selectively reinforcing certain wavelengths of light and interfering with other wavelengths. The unwanted visible wavelengths emitted by the fluorescent material 58 are preferably reflected by the spectral filter 62 for increasing the amount of visible light emitted by the window 50 into the surrounding environment.

On the other side of the fluorescent glass layer 56 exterior of the enclosure 32 is a spectral filter layer 64 for blocking the scattered ultraviolet light 48 from escaping the enclosure 32. Although most of the scattered ultraviolet light 48 converts into the visible light 60 upon encountering the fluorescent glass layer 56, the spectral filter layer 64 enhances safety by accommodating potential bursts of energy and allows for direct viewing of the window 50.

As shown in FIG. 1, windows 50 can be strategically placed within all of the consumable optical modules including the line narrowing module 12 (as discussed above), the line-center analysis module 16, the relay modules 18 and 20, the beam reverser module 24, the spectral analysis module 26, the pulse stretcher module 28, and the shutter module 30. The laser 10 along with its modular subsystems is preferably mounted within a housing 68 (shown in phantom line in FIG. 1), and a viewing window 70 is preferably formed in the housing 68 for observing the light output 60 of the windows 50 while the laser 10 is fully operational. As an added safety measure, a spectral filter for blocking the scattered ultraviolet light can be incorporated into the window 70 so that the observer remains protected in the event of a larger failure, such as a structural failure, allowing the escape of ultraviolet light from either of the cavities 12, or 22, any of the optical subsystems 14, 16, 18, 20, 24, 26, 28, or 30, or the connecting tubes 36. Alternatively, the housing 68 could be opened by a qualified technician for observing the windows 50 directly as a part of an inspection protocol or emergency repair.

Generally, the windows 50 are positioned to be within the line of sight of engagements between the components the laser beam 15 that are expected to produce scattered light as a function of the components' known mode of degradation and failure. However, additional optics can be incorporated into the optical modules to redirect or concentrate the scattered light 48 upon the windows 50.

For example, FIG. 4 shows a simplified version of relay module 18 including a beam-folding component 74 (e.g., a plane mirror or prism) within an enclosure 76. The light beam 15 enters the enclosure 76 through an entrance aperture 78, and the beam-folding component 74 redirects the light beam 15 through an exit aperture 80. Accompanying the anticipated deterioration of the beam-folding component 74, ultraviolet light 48 scatters from the beam-folding component 74 towards a corner of the enclosure 76—a location that would not be readily observable from outside the enclosure 76. However, the scattered light 48 is collected by a beam-collecting component 82 (e.g., a spherical mirror) and redirected in a concentrated form towards a beam-folding component 84 (e.g., a mirror), which further redirects the concentrated scattered light 48 to the fluorescent window 50. As described above, the fluorescent window converts the incident scattered ultraviolet light 48 into visible light 60 emanating from the fluorescent window 50.

Thus, in situations where it may not be possible or otherwise desirable to position the fluorescent windows 50 within the line of sight of the expected sources of scattered light 48, optics within the module enclosures can be used to redirect the scattered light en route to more desirable locations for the fluorescent windows 50. In addition, optics can be incorporated into the module enclosures for concentrating light onto the fluorescent windows 50. Moreover, the fluorescent windows can be positioned so that only light undesirably scattered from the consumable components reaches the fluorescent windows or can be positioned so that a baseline amount of ultraviolet light reaches the fluorescent windows in accordance with the expected operation of the component, and changes in the amount or area over which the visible light emanates from the fluorescent windows are monitored as an indication the components' degradation.

Figure 5A:
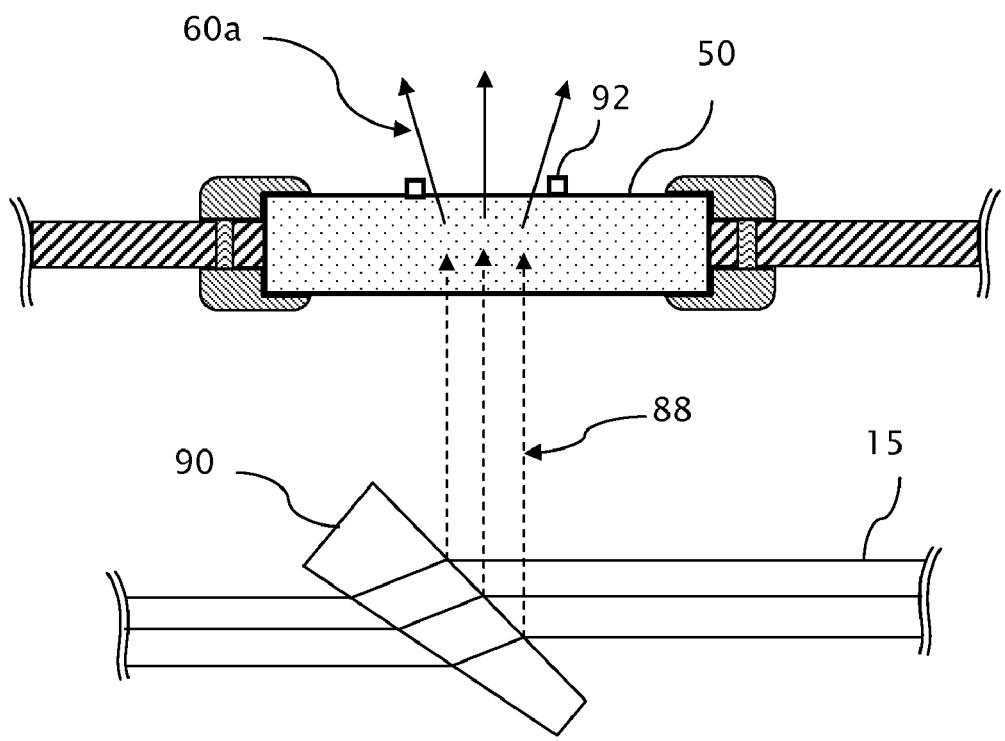
FIGS. 5A and 5B are schematic cross-sectional views of a portion of another module with a fluorescent window positioned for receiving a baseline amount of ultraviolet light from a component in both non-degraded and degraded conditions.

FIGS. 5A and 6A depict fluorescent window 50 of a representative optical module aligned with an anticipated partial reflection of ultraviolet light 88 from a prism component 90 as a side effect of the primary refractive engagement of the light beam 15 with the prism component 90. A reticle 92 is formed on the window 50 circumscribing the expected location of visible light 60a emanating from the window 50 in response to the fluorescence produced within the window 50 by the expected partial reflection of ultraviolet light 88. Visible light 60a of a given intensity within the confines of the reticle 92 can be viewed as an indication of the intended operation of the component 90.

Figure 5B:
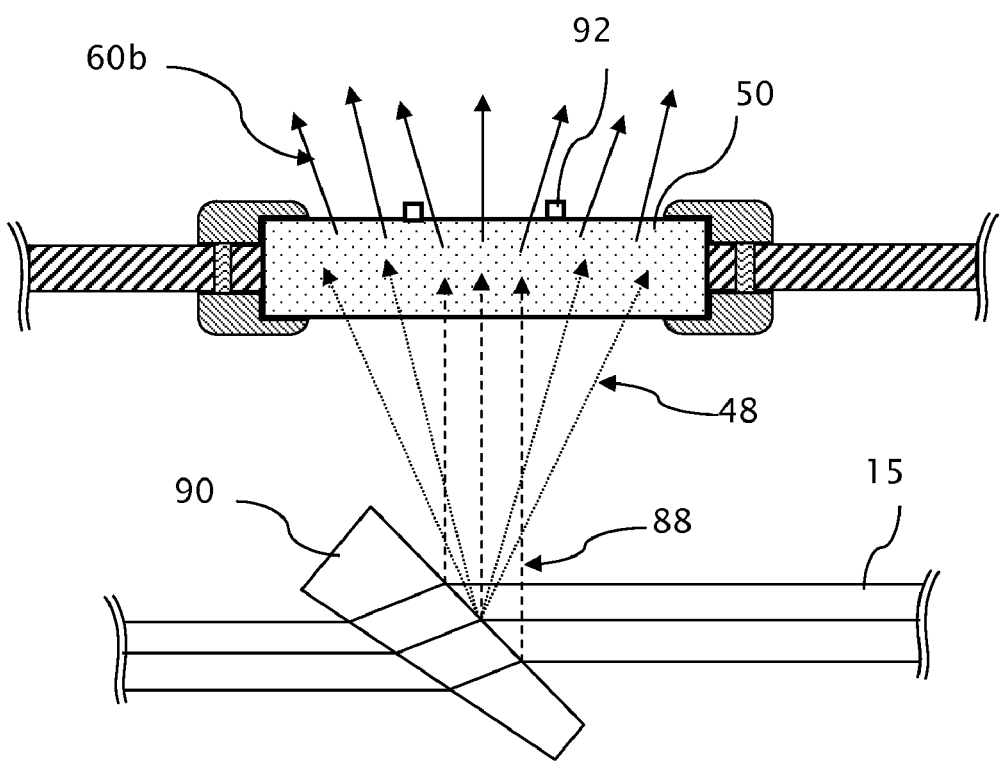

FIGS. 5B and 6B depict the same fluorescent window 50 in alignment with the partial reflection of ultraviolet light 88 from the prism component 90 but also depict a scattering of ultraviolet light 98 from the prism component 90 in response to the anticipated deterioration of the prism component 90 over many cycles of use. The scattered ultraviolet light 48 fills the fluorescent window 50 so that the corresponding fluorescing visible light 60b emanates over an area that extends outside the reticle 92. A change in the intensity or the area over which the visible light 60b emanates (e.g., an emanation outside the reticle 92) can be viewed as an indication of the degradation of the prism component's performance.

Figure 7:
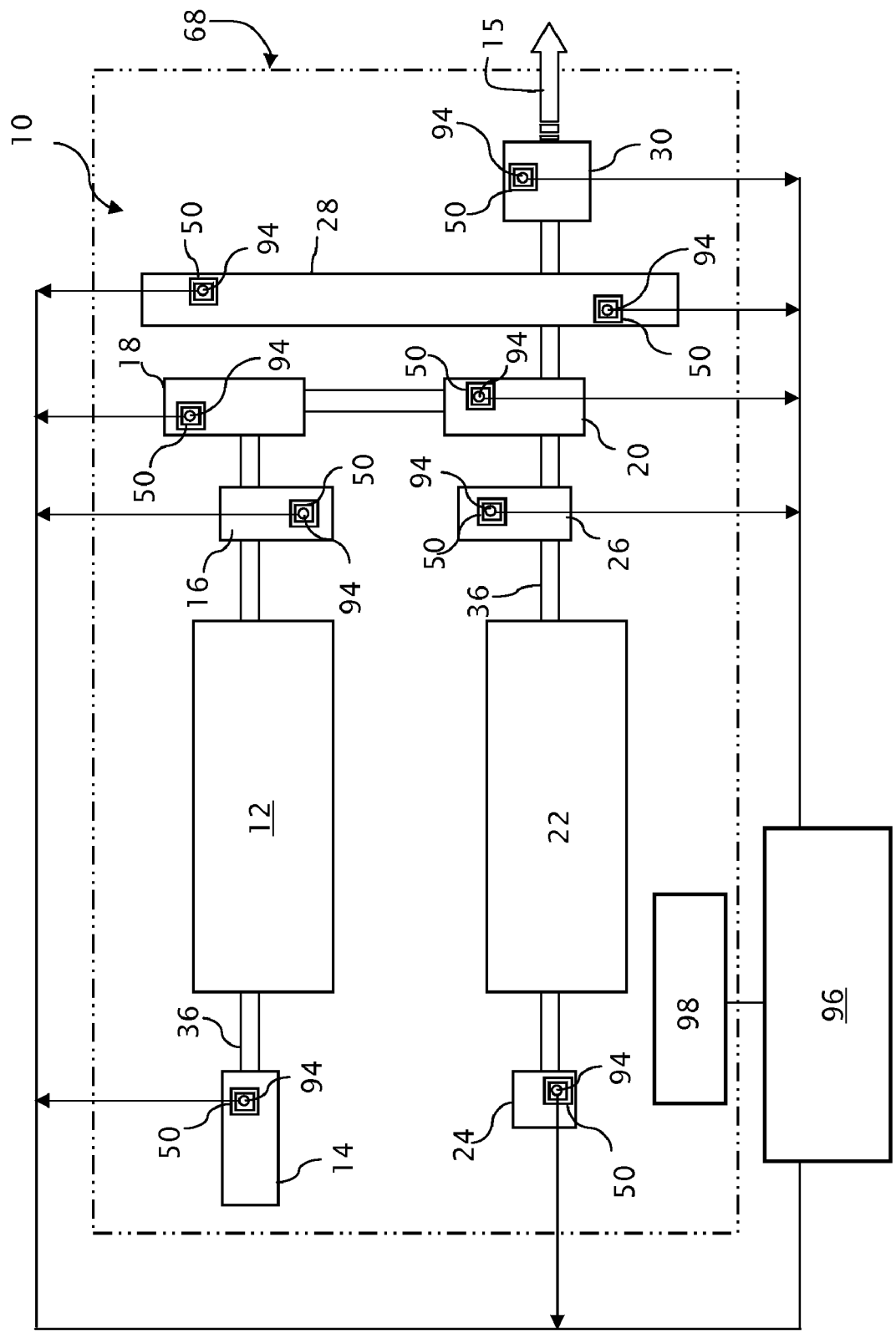
FIG. 7 is a diagram of the high-power excimer laser of FIG. 1 incorporating an electronic inspection system for monitoring light emitted from the optical modules.

In place of or in addition to visually monitoring the fluorescent windows 50, electronic sensors 94, as shown in FIG. 7, can be optically coupled to the fluorescent windows 50 for electronically monitoring the light output from the fluorescent windows 50. The sensors 94 can be arranged to monitor the overall output of light from the fluorescent windows 50 or can be arranged to monitor the distribution of light output of light from the fluorescent windows 50. Signals output from the sensors 94 can be individually communicated to a controller 96 or the signals can be grouped for communicating over with the controller 96 over a network. Within the controller 96, the signal outputs from the sensors 94 are monitored for changes indicative of a degradation in the performance of the individual optical modules 14, 16, 18, 20, 24, 26, 28, and 30. Sensed changes in the amount of light or area over which the visible light 60 is emitted from the windows 50 beyond given thresholds can be interpreted as indications of a significant degradation of the components within the monitored modules. Higher thresholds can be set as indications of the outright failure of the components within the modules.

An output device 98, which can include a simple light emitting diode (LED) array of warning lights, a monitor for displaying text, of other interface for presenting information, is connected to the controller 96 for identifying failing or failed optical modules or other information relating to the optical performance of the modules based on the visual indications given by the fluorescent windows 50. In addition, a recording device can be connected to the controller 96 for recording output of the sensors 94 on a regular basis along with data regarding the laser operation. Patterns of changes in the sensed visual output from the monitored modules can be compared to known patterns of change preceding threshold degradations or failure for indicating the instant condition of the modules or for predicting the amount of remaining useful life of the modules. The information processed from the fluorescing windows 50 can be used to schedule a downtime for replacing deteriorated or failing modules before an outright failure occurs that requires the laser 10 to be shut down on an emergency basis. In the event of an outright failure, information processed for identifying the failed module or modules can be used by a technician to simplify and speed the repair of the laser 10.

Although the invention has been described with respect to a limited number of embodiments and with respect to a particular laser, those of skill in the art will appreciate the wider applicability and other variations apparent from the overall teaching of the invention.

The invention claimed is:

1. A system for monitoring the degradation of an optical module subsystem of an ultraviolet laser comprising:
    an optical module including
       a component for engaging an ultraviolet laser beam propagating through the module,
       an enclosure for confining the component within an operating environment, and one or more apertures within the enclosure for supporting the ingress and egress of the ultraviolet laser beam through the enclosure, the component of the optical module being subject to degradation manifest as a scattering of a portion of the ultraviolet laser beam, and a window formed in the enclosure incorporating a fluorescent material for converting ultraviolet light scattered from the component of the optical module into visible light emanating from the window.

2. The system of claim 1 including a spectral filter associated with the window for blocking the ingress of the visible light from the fluorescent material into the enclosure.

3. The system of claim 1 including a spectral filter associated with the window for blocking the egress of the scattered ultraviolet light out of the enclosure.

4. The system of claim 1 in which the fluorescent material is located between a first spectral filter for blocking the ingress of the visible light from the fluorescent material into the enclosure and a second spectral filter for blocking the egress of the scattered ultraviolet light out of the enclosure.

5. The system of claim 1 in which the enclosure is made of a non-optically transmissive material for confining ultraviolet light within the enclosure and is sealed for confining a non-reactive atmosphere for ultraviolet light propagation and in which the window interrupts the enclosure while maintaining the confinement of both the ultraviolet light and the non-reactive atmosphere within the enclosure.

6. The system of claim 1 in which the window is located within an uninterrupted line of sight to the component.

7. The system of claim 1 including an optic within the enclosure for redirecting light scattered from the component in a direction toward the window.

8. The system of claim 1 including an optic for collecting ultraviolet light scattered from the component and concentrating the collected light onto the window.

9. The system of claim 1 in which the fluorescent material is incorporated within the window.

10. The system of claim 9 in which the window is made of an amorphous glass and the fluorescent material is incorporated as a dopant within the amorphous glass.

11. The system of claim 1 in which the window includes target markings for gaging a size or shape of a region of the window subject to fluorescing.

12. The system of claim 11 in which the target is aligned with a partially reflected image of the laser beam, and the scattering associated with a degradation of the optical component alters the size or shape of the region subject to fluorescing.

13. The system of claim 1 further comprising a sensor for detecting visible light emanating from the window.

14. The system of claim 13 further comprising a controller that is (a) connected to the sensor for monitoring changes in an amount of visible light emanating from the window and (b) connected to an output device for providing an indication of a significant degradation of the component within the module.

15. The system of claim 14 in which the controller includes processing capabilities for recognizing trends or other changes indicative of component degradation or predictive of component failure.

16. The system of claim 1 in which the optical module is one of a plurality of optical modules located within a common housing and a viewing window is formed in the housing for viewing the window formed within the enclosure of the optical module.

17. The system of claim 1 in which the optical module is one of a plurality of optical modules located within a common housing and further comprising an optic for transmitting the visible light emanating from the window formed within the enclosure of the optical module to a location external to the common housing.

18. A method of maintaining an ultraviolet laser in which one or more optical modules of the laser has a window treated for converting scattered ultraviolet light into visible light emanating from the window, comprising steps of:

monitoring for visible light emanating from the window of the optical module as an indication of ultraviolet light of a laser beam being scattered within the module, evaluating the monitored visible light to determine if optical performance of the optical module has degraded, and removing the optical module following a determination based on the evaluation of the monitored visible light that the optical performance of the module has degraded beneath a threshold.

19. The method of claim 18 in which the step of monitoring includes viewing the window of the optical module through a viewing window in a laser housing containing the optical module together with an oscillator chamber for forming or amplifying the laser beam.

20. The method of claim 18 in which the step of monitoring includes collecting a signal from a sensor that is positioned for detecting visible light emanating from the window of the optical module.

21. The method of claim 20 in which the step of evaluating includes processing the sensor signal in a controller and providing an indication within an output device of a significant degradation of the optical module.

22. The method of claim 21 in which the step of evaluating further includes monitoring changes in the visible light detected by the sensor and comparing the changes to known failure modes for anticipating failure of the optical module.

23. The method of claim 22 including an additional step of scheduling a downtime for the laser based on the anticipated failure of the optical module for performing the step of removing the optical module from the laser and for replacing the optical module with a like module during the scheduled downtime.

24. The method of claim 18 in which the step of evaluating includes determining if a change in an amount of visible light emanating from the window of the optical module is above a threshold.

25. The method of claim 18 in which the step of evaluating includes determining if a change in area over which the visible light emanates from the window of the optical module is above a threshold.

26. The method of claim 18 including a step of shutting down the laser or scheduling the laser for shutdown based on a change in the amount or area over which visible light emanates from the window.

27. The method of claim 18 in which (a) the step of monitoring for visible light includes monitoring for visible light emanating from windows in a plurality of optical modules within a common laser housing, and (b) the step of evaluating the monitored visible light includes evaluating the monitored visible light from the plurality of optical modules to determine if optical performance of one or more of the optical modules has degraded, and (c) the step of removing the optical module from the laser includes removing the one or more optical modules found to have degraded beneath the threshold.

28. An ultraviolet laser assembly comprising
an oscillator chamber for forming or amplifying a laser beam, a plurality of optical modules positioned along an optical pathway of the laser beam, each of the optical modules including
- a component for engaging an ultraviolet laser beam propagating through the module, the component being subject to degradation manifest as a scattering of a portion of the ultraviolet laser beam,
- an enclosure for confining the component within an operating environment, and
- one or more apertures within the enclosure for supporting the ingress and egress of the ultraviolet laser beam through the enclosure, windows formed in the enclosures of a plurality of the optical modules, and the windows being treated to convert ultraviolet light scattered from the components of the optical modules into visible light emanating from the windows.

29. The laser assembly of claim 28 further comprising a housing for containing the oscillator chamber and the plurality of optical modules, and the housing includes a viewing window through which the windows formed in the enclosures of the optical modules can be viewed.

30. The laser assembly of claim 28 further comprising (a) sensors for detecting the visible light emanating from the windows of the optical modules, (b) a controller for receiving signals from the sensors and evaluating the signals to determine if the optical performance of any of the optical components has degraded, and (c) an output device for providing indications of any significant degradations among the optical modules.

31. The laser assembly of claim 30 in which the controller compares changes in the visible light detected by the sensors to known failure modes for anticipating failure of one or more of the optical modules.

32. A method of identifying a degraded optical module of an ultraviolet laser system in which an optical component within the module produces scattered ultraviolet light accompanying a degradation in the component's optical performance, comprising steps of:
- positioning a window to intercept the scattered ultraviolet light and be visible to an observer,
- providing the window with fluorescent properties responsive to the scattered ultraviolet light to emit visible light observable by the observer.

33. The method of claim 32 including a step of assessing the amount or distribution of the visible light emitted from the window to determine if optical performance of the optical component has degraded.

34. The method of claim 33 including a step of reporting on a status of the optical module based on the determination of whether the performance of the optical component has degraded.

35. The method of claim 33 including a step of scheduling a downtime for the laser based on the determination of whether the performance of the optical component has degraded.

* * * * *